(12) United States Patent
Kim

(10) Patent No.: US 7,801,875 B2
(45) Date of Patent: Sep. 21, 2010

(54) METHOD OF SEARCHING FOR SUPPLEMENTARY DATA RELATED TO CONTENT DATA AND APPARATUS THEREFOR

(75) Inventor: Mun-jo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 11/938,348

(22) Filed: Nov. 12, 2007

(65) Prior Publication Data

US 2008/0294636 A1   Nov. 27, 2008

(30) Foreign Application Priority Data

May 23, 2007   (KR) .................... 10-2007-0050255

(51) Int. Cl.
 *G06F 17/30* (2006.01)
(52) U.S. Cl. ...................................... 707/706
(58) Field of Classification Search ............ 707/2, 707/6, 706; 715/500; 725/115
 See application file for complete search history.

(56) References Cited

U.S. PATENT DOCUMENTS

| 2003/0140309 A1* | 7/2003 | Saito et al. ............ 715/500 |
| 2005/0229227 A1* | 10/2005 | Rogers ................. 725/115 |
| 2006/0074748 A1* | 4/2006 | Kline et al. ............ 705/14 |

FOREIGN PATENT DOCUMENTS

KR   10-2000-0058970 A   10/2000

* cited by examiner

*Primary Examiner*—Etienne P LeRoux
(74) *Attorney, Agent, or Firm*—Sughrue Mion, PLLC

(57) ABSTRACT

Provided are a method of receiving metadata including keywords related to content data and searching for supplementary data by using the keywords after the content data is reproduced, and an apparatus therefore. The method comprises receiving content data to be reproduced; receiving metadata including at least one keyword related to the content data; and searching for supplementary data related to the content data by using the at least one keyword included in the metadata. According to the present invention, metadata may be accessed during reproduction of content data or after the content data is completely viewed by using a keyword table, and supplementary data may be easily found in a television (TV) browser, by displaying the keywords as recommended keyword buttons.

16 Claims, 7 Drawing Sheets

FIG. 3

```
<Data id = "123" start = "102030" end = "103030">
    <Keyword Type = "Adv"> SUNG YURI'S HAT</Keyword>
    <Keyword Type = "Tourist Attraction"> LAPLAND </Keyword>
    <Keyword Type = "Actor/Actress"> SUNG YURI</Keyword>
</Data>
<Data id = "124" start = "202030" end = "203030">
    <Keyword Type = "Adv"> HYUN BIN'S BAG </Keyword>
    <Keyword Type = "Tourist Attraction"> KYUNGJU WORLD </Keyword>
    <Keyword Type = "Actor/Actress"> HYUN BIN </Keyword>
</Data>
```

METHOD OF SEARCHING FOR SUPPLEMENTARY DATA RELATED TO CONTENT DATA AND APPARATUS THEREFOR

CROSS-REFERENCE TO RELATED PATENT APPLICATION

This application claims priority from Korean Patent Application No. 10-2007-0050255, filed on May 23, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to searching for supplementary data related to content data, and more particularly, to receiving metadata including keywords related to content data such as video on demand (VOD) data and conveniently searching for supplementary data by using the keywords after the content data is viewed.

2. Description of the Related Art

Due to digital broadcasting, in addition to the content of audio visual (A/V) data, supplementary data related to the content data may be transmitted in order to provide various services.

However, in the related art, when content data such as VOD data is viewed, the supplementary data may only be used while the content data is being reproduced. That is, the supplementary data related to a corresponding scene of the content data being currently reproduced, is displayed at a certain position on a screen or bidirectionally controlled by a user interface together with the content data.

If the supplementary data is displayed on the screen together with the content data being reproduced on the screen, a user may be distracted when viewing the content data. Also, the supplementary data provided while the VOD data is being reproduced is not provided after the VOD data is completely reproduced. Furthermore, in order to add more supplementary data to the content data, the content data has to be totally re-encoded.

Even when link addresses of Internet sites including corresponding information are to be provided, only one fixed link address is allowed and thus the amount of information is quite restricted.

SUMMARY OF THE INVENTION

Exemplary embodiments of the present invention provide a method of receiving metadata including keywords related to content data and conveniently searching for supplementary data by using the keywords after the content data is viewed, and an apparatus therefore.

According to an aspect of the present invention, there is provided a method of searching for supplementary data related to content data, the method including receiving content data to be reproduced; receiving metadata including one or more keywords related to the content data; and searching for supplementary data related to the content data by using the keywords included in the metadata.

The searching of the supplementary data may include generating a keyword table by using the keywords included in the metadata after the content data is completely reproduced; and searching for the supplementary data related to the content data by using the keyword table.

The metadata may include time information that indicates a period of time when the metadata is applied during reproduction of the content data; and the keyword table may include scene information of a scene of the content data that was reproduced during a period of time corresponding to the time information of the metadata.

If a user wants to reproduce a scene of the content data related to a keyword included in the keyword table after the content data is completely reproduced, the method may further include reproducing the scene which was reproduced during a period of time corresponding to the time information of the metadata.

The method may further include parsing the received metadata; synchronizing the parsed metadata with the content data; and notifying the fact that the supplementary data related to the content data exists, during a period of time when the synchronized metadata is applied while the content data is being reproduced.

If the supplementary data is requested during the period of time when the synchronized metadata is applied while the content data is being reproduced, the method may further include searching for the requested supplementary data by using the keywords included in the metadata; and outputting the search results of the supplementary data on a screen while the content data is being reproduced.

If the supplementary data is not requested during the period of time when the synchronized metadata is applied while the content data is being reproduced, the method may further include storing the metadata until the content data is completely reproduced.

If a network is searched by using a browser after the content data is completely reproduced, the searching of the supplementary data may further include providing the keywords included in the metadata as recommended keyword buttons.

The method may further include storing keywords used for searching for supplementary data in a history file, wherein the providing of the recommended keyword buttons comprises determining priorities of the recommended keyword buttons in accordance with frequencies of use of the keywords in the history file.

According to another aspect of the present invention, there is provided an apparatus for searching for supplementary data related to content data, the apparatus including a content reception unit which receives content data to be reproduced; a content reproduction unit which reproduces the content data; a metadata reception unit which receives metadata including one or more keywords related to the content data; and a supplementary data processing unit which searches for supplementary data related to the content data by using the keywords included in the metadata.

The supplementary data processing unit may include a keyword table processing unit which generates a keyword table by using the keywords included in the metadata after the content data is completely reproduced; and a supplementary data searching unit which searches for the supplementary data related to the content data by using the keyword table.

The metadata may include time information which indicates a period of time when the metadata is applied during reproduction of the content data; and the keyword table may include scene information of a scene of the content data reproduced during a period of time corresponding to the time information of the metadata.

If a user wants to reproduce a scene of the content data related to a keyword included in the keyword table after the content data is completely reproduced, the content reproduction unit may reproduce the scene which was reproduced during a period of time corresponding to the time information of the metadata.

The apparatus may further include a metadata parser which parses the received metadata; a metadata synchronization unit which synchronizes the parsed metadata with the content data; and a supplementary data notification unit which notifies the fact that the supplementary data related to the content data exists during a period of time when the synchronized metadata is applied while the content data is being reproduced.

If the supplementary data is requested during the period of time when the synchronized metadata is applied while the content data is being reproduced, the supplementary data processing unit may search for the requested supplementary data by using the keywords included in the metadata and outputs the search results of the supplementary data on a screen while the content data is being reproduced.

If the supplementary data is not requested during the period of time when the synchronized metadata is applied while the content data is being reproduced, the supplementary data processing unit may store the metadata until the content data is completely reproduced.

If a network is searched by using a browser after the content data is completely reproduced, the supplementary data processing unit may provide the keywords included in the metadata as recommended keyword buttons.

The supplementary data processing unit may store keywords used for searching the supplementary data in a history file and determines priorities of the recommended keyword buttons in accordance with frequencies of use of the keywords in the history file.

According to another aspect of the present invention, there is provided a computer readable recording medium having recorded thereon a computer program for executing a method of searching for supplementary data related to content data.

According to another aspect of the present invention, there is provided a content reproduction device having installed therein an apparatus for searching for supplementary data related to content data.

BRIEF DESCRIPTION OF THE DRAWINGS

The above and other aspects and advantages of the present invention will become more apparent from the following detailed description of exemplary embodiments thereof with reference to the attached drawings in which:

FIG. 3 is a diagram illustrating an example of metadata including keywords related to content data, according to an exemplary embodiment of the present invention;

Like reference numerals in the drawings denote like elements. Although the drawings illustrate exemplary embodiments of the present invention, the drawings are not drawn on a predetermined scale and some features may be exaggerated for clarity.

DETAILED DESCRIPTION OF EXEMPLARY EMBODIMENTS OF THE INVENTION

The attached drawings for illustrating exemplary embodiments of the present invention are referred to in order to gain a sufficient understanding of the present invention, the merits thereof, and the objectives accomplished by implementing exemplary embodiments of the present invention.

Figure 1:
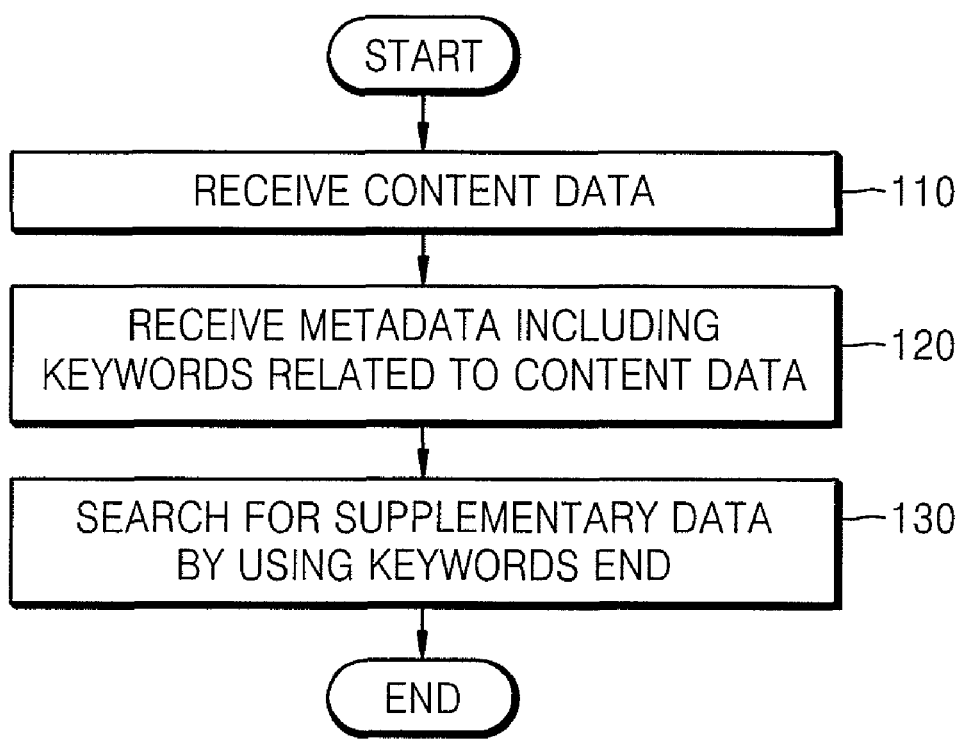
FIG. 1 is a flowchart of a method of searching for supplementary data related to content data, according to an exemplary embodiment of the present invention.

FIG. 1 is a flowchart of a method of searching for supplementary data related to content data, according to an exemplary embodiment of the present invention.

Referring to FIG. 1, the method includes receiving content data to be reproduced (operation 110), receiving metadata including one or more keywords related to the content data (operation 120), and searching for supplementary data related to the content data by using the keywords included in the metadata (operation 130).

Firstly, content data is received in operation 110. Here, the content data may be received through an external network or by using an optical storage medium such as a digital versatile disc (DVD) or a Blue ray disc.

Metadata is received in operation 120. The metadata includes keywords related to the content data. The keywords may be, for example, a product, a location, or an actor/actress appearing in a certain scene of the content data.

Corresponding supplementary data is found by using the keywords in operation 130.

In conclusion, a characteristic and exemplary embodiment of the present invention is receiving metadata including keywords and conveniently searching for desired supplementary data by using the keywords even after content data has been viewed.

Figure 2:
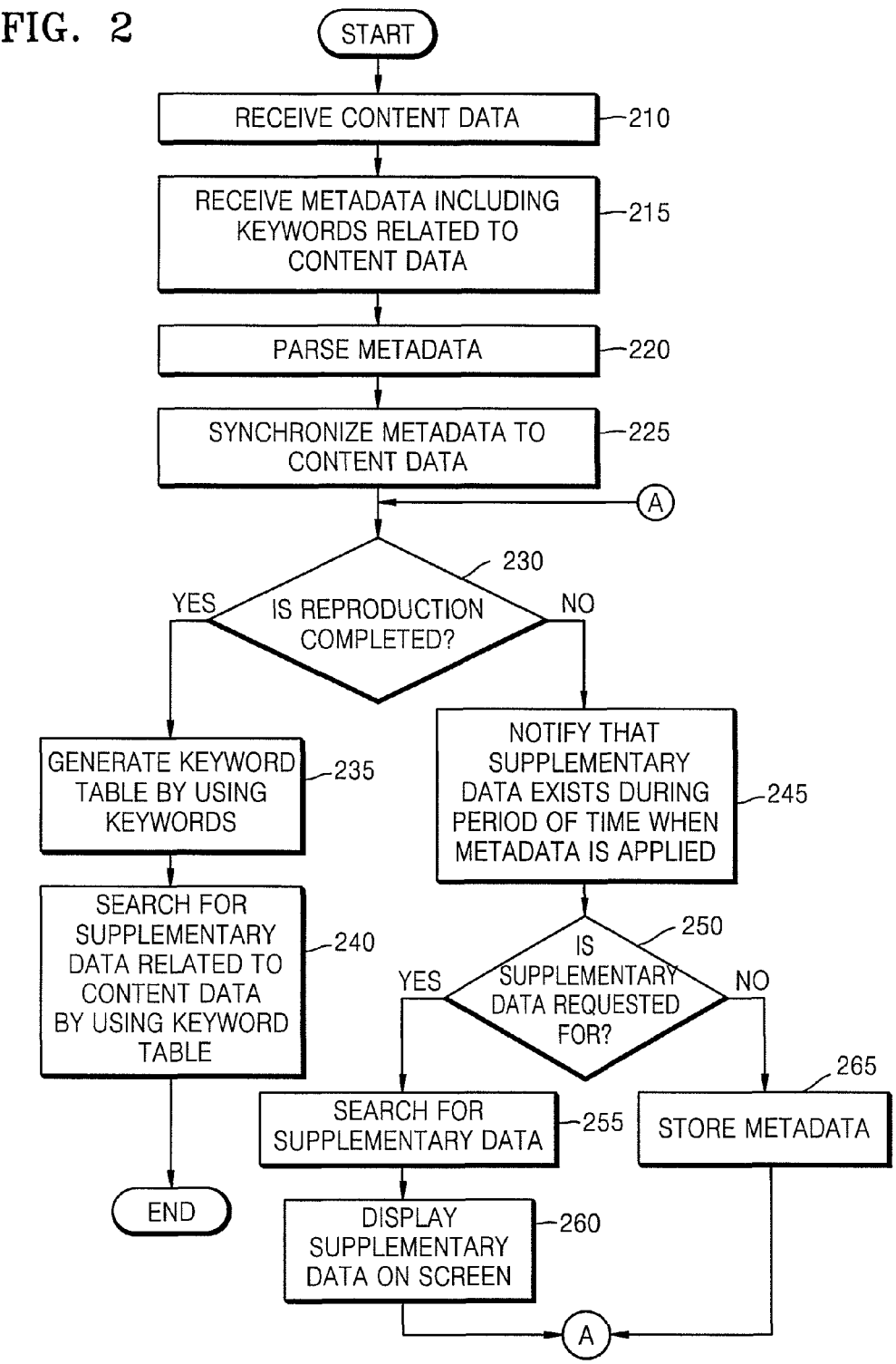
FIG. 2 is a detailed flowchart of a method of searching for supplementary data related to content data, according to another exemplary embodiment of the present invention.

FIG. 2 is a detailed flowchart of a method of searching for supplementary data related to content data, according to another exemplary embodiment of the present invention.

Referring to FIG. 2, content data to be reproduced is received in operation 210 and metadata including one or more keywords related to the content data is received in operation 215, as described above with reference to FIG. 1.

As a pre-processing, the metadata is parsed in operation 220, and the parsed result is stored in a user terminal. The metadata may include time information which indicates a period of time when the metadata is to be provided, and keyword information to be used for searching for supplementary data. The metadata and the content data are synchronized in operation 225.

Here, the metadata will now be described in detail with reference to FIG. 3.

FIG. 3 is a diagram illustrating an example of metadata including keywords related to content data, according to an exemplary embodiment of the present invention.

Referring to FIG. 3, "data id=123" shown in the first line of the metadata represents an identifier (ID) which identifies the metadata. The metadata includes time information such as start time, 'start' and end time 'end'. The time information is required in order to apply the metadata during a corresponding period of time in synchronization with the reproduction time of the content data.

In addition, as "keyword types", "Adv", "Tourist Attraction", and "Actor/Actress" respectively represent a product, a tourist attraction, an actor/actress appearing in a certain scene of the content data.

The metadata illustrated in FIG. 3 is just an example. A variety of metadata including keywords related to content data and time information on when the metadata is applied to the content data may exist.

Referring back to FIG. 2, when it is determined that the content data is completely reproduced in operation 230, a keyword table is generated by using the keywords included in the previously received metadata, in operation 235. The keyword table may include all metadata received while the content data is being reproduced and may show the keywords scene by scene on the keyword table. An example of the keyword table is illustrated in FIG. 5.

Figure 5:
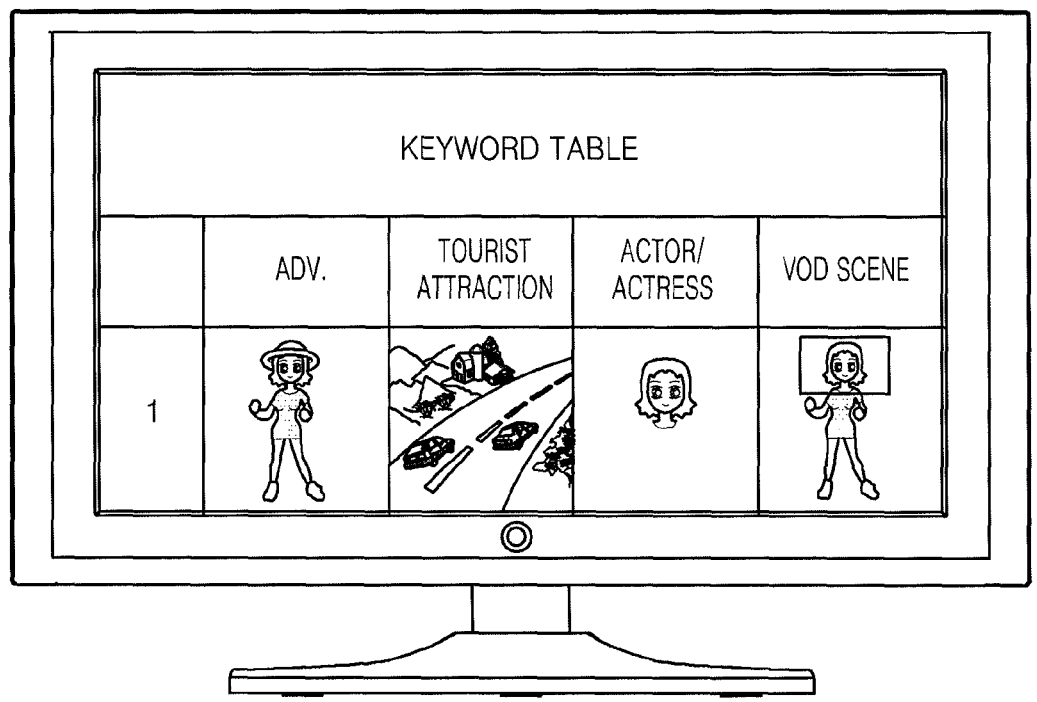
FIG. 5 shows an example of a keyword table displayed on a screen after content data is completely reproduced, according to an exemplary embodiment of the present invention.

FIG. 5 shows an example of a keyword table displayed on a screen after content data is completely reproduced, according to an exemplary embodiment of the present invention. The keyword table includes keywords such as "Adv", "Tourist Attraction", "Actor/Actress", and "VOD Scene" at the top of the keyword table.

Each keyword of the keyword table is included in metadata applied for a period of time for the previously reproduced scenes of the content data. Accordingly, a user may clearly view the keywords scene by scene on the keyword table as illustrated in FIG. 5 even when VOD data is completely reproduced. Also, if the user selects an item of a certain keyword, corresponding supplementary data may be found.

Furthermore, in addition to information on "Adv", "Tourist Attraction", and "Actor/Actress", the user may review a scene of the content data so as to check when or how each item of the keyword table has appeared by selecting "VOD scene", that is, scene information of the content data during a period of time corresponding to the time information of the metadata.

Referring back to FIG. 2, the supplementary data related to the content data is found by using the keyword table in operation 240.

While the content data is being reproduced, and the synchronized metadata is being applied, a fact that the supplementary data related to the content data exists may be notified on a screen. That is, with reference to the time information included in the metadata, a message that notifies that related metadata exists, is displayed on the screen where content data is currently being reproduced. The notification occurs based on the time indicated by the time information included in the metadata in operation 245.

By using the notification message, if a user requests for the supplementary data, the supplementary data is found by using the keywords included in the metadata in operation 255, and the result is directly displayed on the screen in operation 260. However, if the user does not want to view the supplementary data, the metadata is stored in operation 265. The stored metadata is used to generate the keyword table after the content data is completely viewed or reproduced.

Figure 4A:
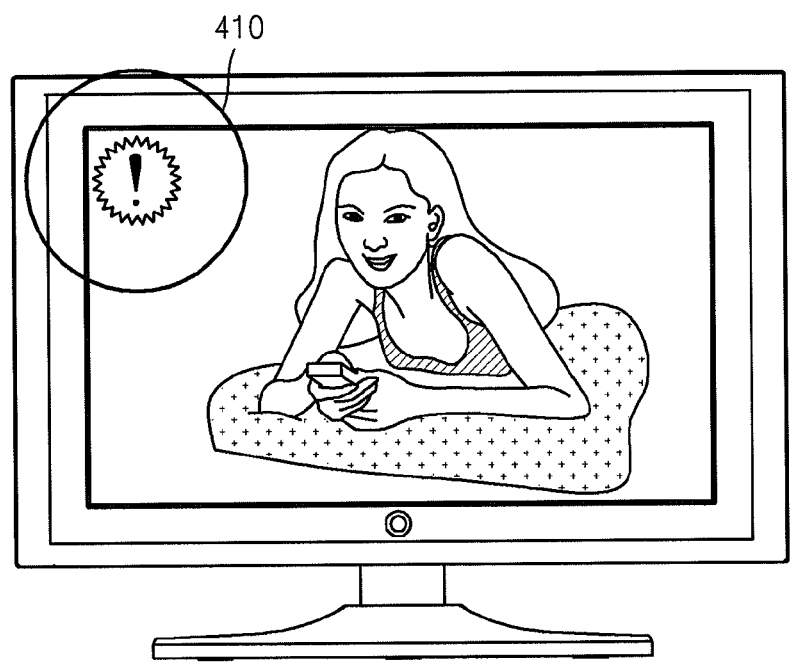
FIGS. 4A and 4B are images of screens which notify that supplementary data related to content data exists while the content data is being reproduced, according to an exemplary embodiment of the present invention.
Figure 4B:
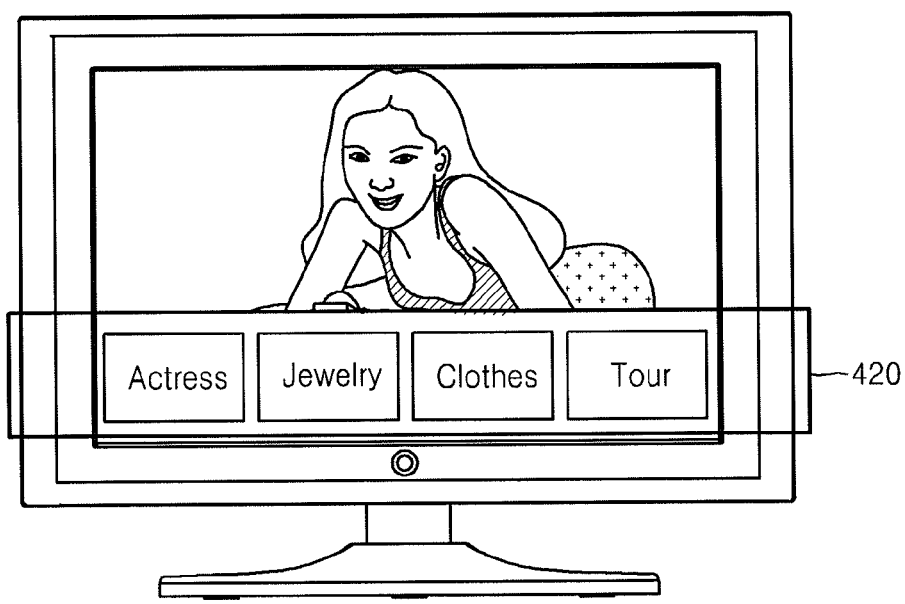

An example of the notification that the related metadata exists while the content data is being reproduced and the finding of the supplementary data is shown in FIGS. 4A and 4B.

FIGS. 4A and 4B are images of screens which notify that supplementary data related to content data exists while the content data is being reproduced, according to an exemplary embodiment of the present invention.

Referring to FIG. 4A, a notification mark 410 is displayed on the top left of a screen while content data is being reproduced. The notification mark 410 represents that metadata related to a current scene exists and thus supplementary data related to the content data can be provided. If a user wants to view the supplementary data on the scene, search results 420 of the supplementary data are displayed on the screen as shown in FIG. 4B.

Meanwhile, a plurality of keywords having appeared during reproduction of the content data may provide convenient services to the user even when the content data is completely reproduced. One of the services may be providing the keywords in a browser, so that the supplementary data can be searched for. This will now be described in detail with reference to FIG. 6.

Figure 6:
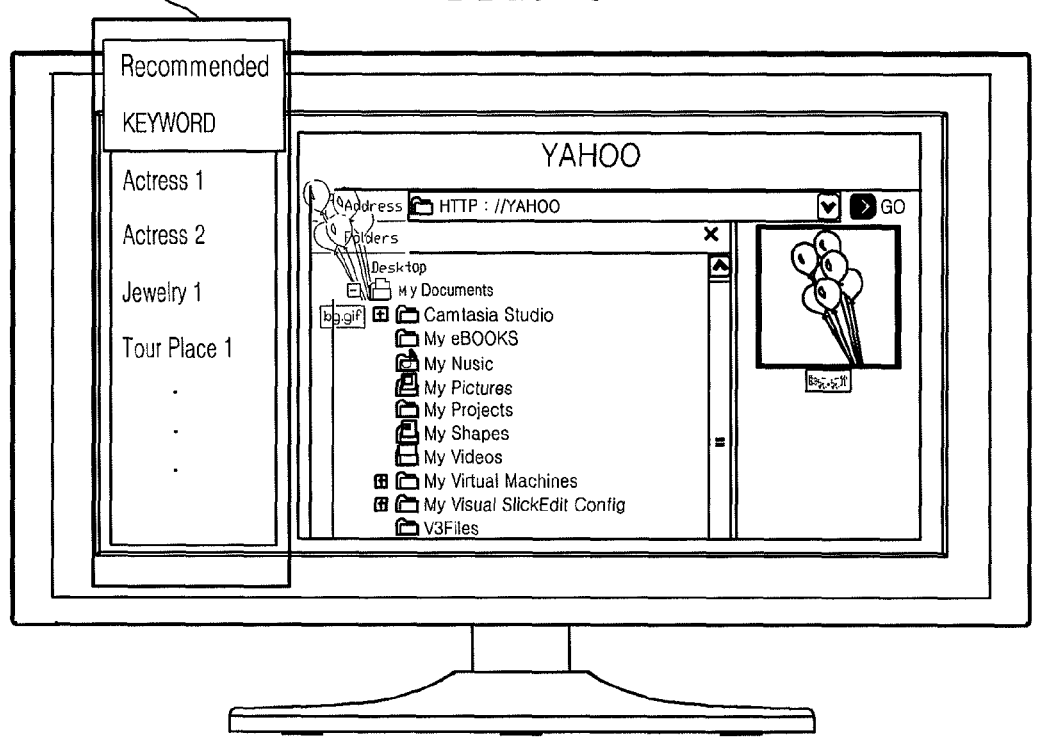
FIG. 6 shows a screen when an Internet network is searched by using a browser after content data is completely reproduced, according to another exemplary embodiment of the present invention.

FIG. 6 shows a screen when an Internet network is searched by using a browser after content data is completely reproduced, according to another exemplary embodiment of the present invention.

When the network is searched by using the browser after a user has viewed the content data, a plurality of keywords received during reproduction of the content data may be utilized to generate recommended keyword buttons 610 shown on the left of FIG. 6. As for televisions (TVs), keys for searching the network may not be easily input. Thus, by providing the recommended keyword buttons 610 on a screen, the user may easily search the network for desired supplementary data. The recommended keywords could be also represented in a variety of formats.

Keywords used for the searching may be stored as a history file. Furthermore, a frequently used keyword included in the history file may be displayed on the screen with priority so that the user may select a desired keyword more promptly and conveniently later.

Figure 7:
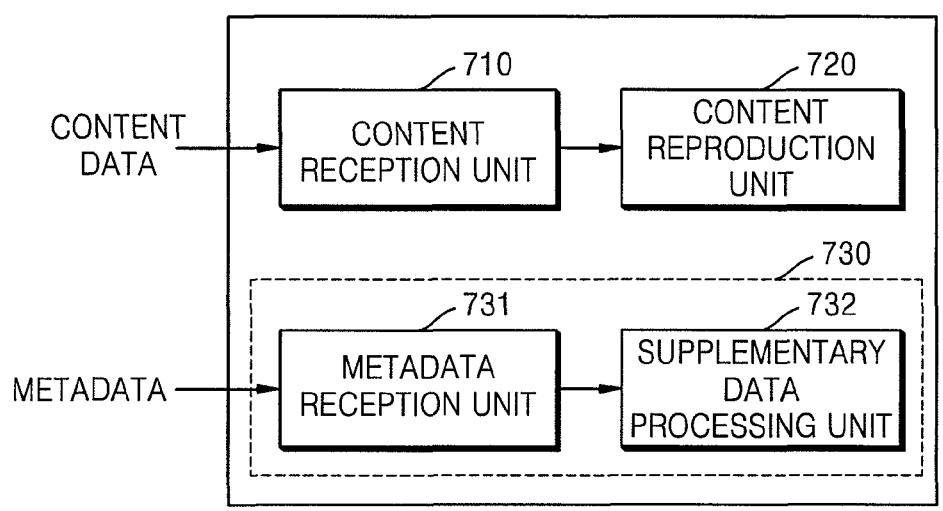
FIG. 7 is a functional block diagram of an apparatus for searching for supplementary data related to content data, according to yet another exemplary embodiment of the present invention.

FIG. 7 is a functional block diagram of an apparatus for searching for supplementary data related to content data, according to an exemplary embodiment of the present invention.

Referring to FIG. 7, the apparatus includes a content data processing block including a content reception unit 710 and a content reproduction unit 720, and a metadata and supplementary data processing block 730 including a metadata reception unit 731 and a supplementary data processing unit 732.

The content reception unit 710 receives content data to be reproduced and the content reproduction unit 720 reproduces the content data and outputs the content data on a screen.

The metadata reception unit 731 receives metadata including one or more keywords related to the content data and the supplementary data processing unit 732 searches for supplementary data related to the content data by using the keywords included in the metadata.

Figure 8:
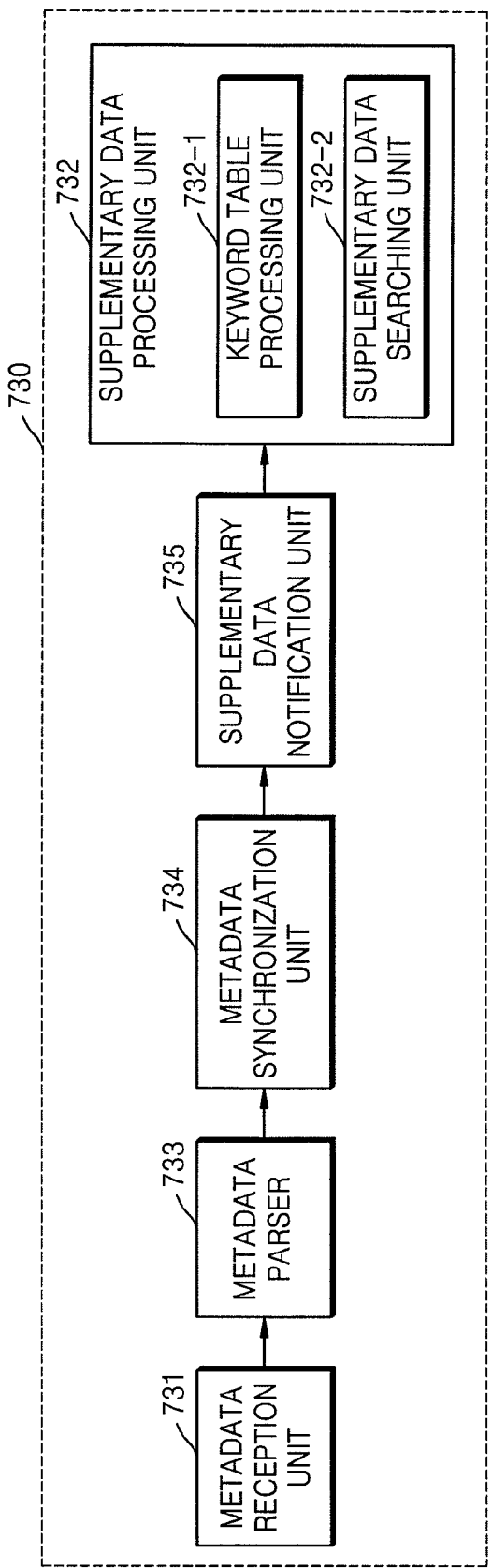
FIG. 8 is a detailed functional block diagram of a metadata and supplementary data processing block, according to an exemplary embodiment of the present invention.

FIG. 8 is a detailed functional block diagram of a metadata and supplementary data processing block 730, according to an exemplary embodiment of the present invention.

Referring to FIG. 8, the metadata and supplementary data processing block 730 may include a plurality of sub-blocks, such as a metadata reception unit 731, a supplementary data processing unit 732, a metadata parser 733, a metadata synchronization unit 734, and a supplementary data notification unit 735.

The metadata reception unit 731 receives metadata including keywords related to content data and the metadata parser 733 parses the received metadata. The metadata synchronization unit 734 synchronizes the parsed metadata with the content data. The supplementary data notification unit 735 notifies that supplementary data related to the content data exists by using a message during a period of time when the synchronized metadata is applied while the content data is being reproduced.

The supplementary data processing unit 732 searches for the supplementary data related to the content data by using the keywords included in the metadata. The supplementary data processing unit 732 may include a keyword table processing unit 732-1 and a supplementary data searching unit 732-2. The keyword table processing unit 732-1 generates a keyword table by using the keywords included in the metadata after the content data is completely reproduced and the supplementary data searching unit 732-2 searches for the supplementary data related to the content data by using the keyword table.

Exemplary embodiments of the present invention can be written as computer programs and can be implemented in general-use digital computers that execute the programs using a computer readable recording medium.

Also, the data structure used in the embodiments of the present invention described above can be recorded on a computer readable recording medium via various means.

Examples of the computer readable recording medium include magnetic storage media (e.g., ROM, floppy disks, hard disks, etc.), and optical recording media (e.g., CD-ROMs, or DVDs).

As described above, according to the present invention, related metadata may be easily inserted into content data without re-encoding the content data; the metadata may be accessed during reproduction of the content data or after the content data is completely viewed by using a keyword table, and supplementary data may be easily found in a TV browser, by displaying the keywords as recommended keyword buttons.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within their scope will be construed as being included in the present invention.

What is claimed is:

1. A method of searching for supplementary data related to content data, the method comprising:
   receiving content data to be reproduced and reproducing the content data;
   receiving metadata, comprising at least one keyword, related to the content data;
   generating a keyword table having the at least one keyword after the content data is completely reproduced; and
   searching for supplementary data related to the content data using the keyword in the keyword table,
   wherein the metadata further comprises time information that indicates a period of time when the metadata is applied during reproduction of the content data; and
   wherein the keyword table includes scene information of a scene of the content data reproduced during a period of time corresponding to the time information of the metadata, the scene information indicating a scene of the content data in which the metadata having the keyword appeared in the content data.

2. The method of claim 1, further comprising, if a request is received to reproduce a scene of the content data related to a keyword included in the keyword table after the content data has been completely reproduced, reproducing the scene which was reproduced during a period of time corresponding to the time information of the metadata.

3. The method of claim 1, further comprising:
   parsing the received metadata;
   synchronizing the parsed metadata with the content data; and
   notifying that the supplementary data related to the content data exists, during a period of time when the synchronized metadata is applied while the content data is being reproduced.

4. The method of claim 3, further comprising, wherein in response to a user requesting the supplementary data during the period of time when the synchronized metadata is applied while the content data is being reproduced:
   searching for the requested supplementary data by using the at least one keyword included in the metadata; and
   outputting the search results of the supplementary data on a screen while the content data is being reproduced.

5. The method of claim 3, further comprising storing the metadata until the content data is completely reproduced, if the supplementary data is not requested during the period of time when the synchronized metadata is applied while the content data is being reproduced.

6. The method of claim 1, wherein the searching the supplementary data further comprises providing the at least one keyword included in the metadata as at least one recommended keyword button, if a network is searched by using a browser after the content data is completely reproduced.

7. The method of claim 6, further comprising storing keywords used for searching the supplementary data in a history file, wherein the providing the at least one recommended keyword button comprises determining priorities of the recommended keyword buttons in accordance with frequencies of use of the keywords stored in the history file.

8. An apparatus for searching for supplementary data related to content data, the apparatus comprising:
   a content reception unit which receives content data to be reproduced;
   a content reproduction unit which reproduces the content data;
   a metadata reception unit which receives metadata, comprising at least one keyword, related to the content data; and
   a supplementary data processing unit which searches for supplementary data related to the content data using the keyword included in the metadata,
   wherein the supplementary data processing unit comprises:
      a keyword table processing unit which generates a keyword table having the at least one keyword included in the metadata after the content data is completely reproduced; and
      a supplementary data searching unit which searches for the supplementary data related to the content data by using the keyword table, and
   wherein the metadata further comprises time information that indicates a period of time when the metadata is applied during reproduction of the content data; and
   wherein the keyword table includes scene information of a scene of the content data reproduced during a period of time corresponding to the time information of the metadata, the scene information indicating a scene of the content data in which the metadata having the keyword appeared in the content data.

9. The apparatus of claim 8, wherein if a request is received to reproduce a scene of the content data related to a keyword included in the keyword table after the content data has been completely reproduced, the content reproduction unit reproduces the scene which was reproduced during a period of time corresponding to the time information of the metadata.

10. The apparatus of claim 8, further comprising:
a metadata parser which parses the received metadata;
a metadata synchronization unit which synchronizes the parsed metadata with the content data; and
a supplementary data notification unit which notifies that the supplementary data related to the content data exists during a period of time when the synchronized metadata is applied while the content data is being reproduced.

11. The apparatus of claim 10, wherein in response to a user requesting the supplementary data during the period of time when the synchronized metadata is applied while the content data is being reproduced, the supplementary data processing unit searches for the requested supplementary data by using the at least one keyword and outputs the search results of the supplementary data on a screen while the content data is being reproduced.

12. The apparatus of claim 10, wherein the supplementary data processing unit stores the metadata until the content data is completely reproduced, if the supplementary data is not requested during the period of time when the synchronized metadata is applied while the content data is being reproduced.

13. The apparatus of claim 8, wherein the supplementary data processing unit provides the at least one keyword included in the metadata as at least one recommended keyword button, if a network is searched by using a browser after the content data is completely reproduced.

14. The apparatus of claim 13, wherein the supplementary data processing unit stores keywords used for searching the supplementary data in a history file and determines priorities of the recommended keyword buttons in accordance with frequencies of use of the keywords in the history file.

15. A computer readable recording medium having recorded thereon a computer program for executing the method of searching for supplementary data related to content data, the method comprising:
receiving content data to be reproduced and reproducing the content data;
receiving metadata, comprising at least one keyword, related to the content data;
generating a keyword table having the at least one keyword after the content data is completely reproduced; and
searching for supplementary data related to the content data using the keyword in the keyword table,
wherein the metadata further comprises time information that indicates a period of time when the metadata is applied during reproduction of the content data and
wherein the keyword table includes scene information of a scene of the content data reproduced during a period of time corresponding to the time information of the metadata, the scene information indicating a scene of the content data in which the metadata having the keyword appeared in the content data.

16. A content reproduction device having installed therein an apparatus for searching for supplementary data related to content data, the apparatus comprising:
a content reception unit which receives content data to be reproduced;
a content reproduction unit which reproduces the content data;
a metadata reception unit which receives metadata, comprising at least one keyword, related to the content data; and
a supplementary data processing unit which searches for supplementary data related to the content data using the keyword included in the metadata,
wherein the supplementary data processing unit comprises:
a keyword table processing unit which generates a keyword table having the at least one keyword included in the metadata after the content data is completely reproduced; and
a supplementary data searching unit which searches for the supplementary data related to the content data by using the keyword table, and
wherein the metadata further comprises time information that indicates a period of time when the metadata is applied during reproduction of the content data and
wherein the keyword table includes scene information of a scene of the content data reproduced during a period of time corresponding to the time information of the metadata, the scene information indicating a scene of the content data in which the metadata having the keyword appeared in the content data.

* * * * *